United States Patent [19]

Wilson et al.

[11] Patent Number: 4,831,493
[45] Date of Patent: May 16, 1989

[54] WINDSHIELD MOISTURE SENSOR

[75] Inventors: James F. Wilson, Worthington; Harry S. Koontz, Penn Hills Township, Allegheny County; William E. Wagner, Verona; John J. Everhart, New Kensington; Glen E. Freeman, Tarentum; Harold E. Donley, deceased, late of Oakmont, all of Pa., by Janice J. Donley, legal representative

[73] Assignee: PPG Industries, Inc., Pittsburgh, Pa.

[21] Appl. No.: 138,751

[22] Filed: Dec. 28, 1987

[51] Int. Cl.⁴ .................................. H01G 5/20
[52] U.S. Cl. ............................ 361/286; 73/336.5
[58] Field of Search ................ 361/286; 73/336.5; 324/61 R; 338/35; 318/444, 443

[56] References Cited

U.S. PATENT DOCUMENTS

| 3,523,244 | 8/1970 | Goodman et al. | 73/336.5 X |
| 4,386,336 | 5/1983 | Kinomoto et al. | 73/336.5 X |
| 4,703,237 | 10/1987 | Hochstein | 318/444 X |

Primary Examiner—Donald A. Griffin
Attorney, Agent, or Firm—Andrew C. Siminerio

[57] ABSTRACT

A moisture sensor to sense rain on a windshield. The sensor members on the outboard surface of the windshield are uncoated and directly exposed to any moisture accumulation on the sensor. Leads connect the sensor to an electrical signal generator and receiver and are insulated from each other to prevent direct electrical interconnection therebetween and subsequent shorting of the sensor circuitry. When moisture is on the sensor, the nature of a monitorable electrical signal passing through the sensor changes and is detected. In response to the altered signal, the windshield wipers are actuated.

24 Claims, 2 Drawing Sheets

WINDSHIELD MOISTURE SENSOR

BACKGROUND OF THE INVENTION

1. Field of the Invention

This invention relates to an apparatus for detecting moisture on a substrate, and in particular, to a moisture sensor mounted on a windshield that senses moisture and actuates a windshield wiper motor.

2a. Technical Considerations

When operating a vehicle, it is important to maintain a clear undistorted viewing area through the windshield of the vehicle. Windshield wiper mechanisms are provided to clear selected portions of the windshield of water and/or dirt that may obscure the vehicle operator's vision.

Moisture sensors have been used to sense rain on windshields. These sensors, which include electrically conductive members having a Protective coating on the exterior surface of the windshield, automatically actuate a windshield wiper motor to remove the water and clear the vision area. The conductive members are generally arranged in a fixed relationship to form variable capacitors whose output varies as a function of moisture absorbed by the overlaying protective coating.

2b. Patents of Interest

U.S. Pat. No. 4,164,868 to Suntola teaches a capacitive humidity transducer having an electrically nonconductive base carrying at least a pair of spaced, electrically conductive coatings along the major surface of the base. A dielectric film which is active with respect to water absorption is also carried by the base and covers at least a portion of the coatings. The dielectric film has a dielectric constant which varies as a function of the extent to which water has been absorbed by the film. An outer, electrically conductive, water-permeable layer is supported by the dielectric film. The dielectric film maintains the outer layer permanently out of contact with at least one of the coatings so that it is possible to measure a capacitance between these coatings, which is indicative of humidity in the atmosphere.

U.S. Pat. No. 4,429,343 to Freud teaches a humidity-sensing element having two sets of interdigitated, thin film platinum fingers deposited on the surface of a glass substrate. The film is covered by a coating of water-absorbing material such as cellulose acetate butyrate or silicone rubber. The humidity sensitivity of the sensor results from the humidity-related dielectric constant change which occurs in the coating over the fingers. As this dielectric constant changes, so does the capacitance between the interdigitated fingers.

U.S. Pat. No. 4,639,831 to Iyoda teaches a transparent sensor for detecting rain on window glass located within the wiping area on the exterior surface of the window glass. The sensor includes a pair of spaced apart electrodes having interdigitated finger members that are insulated electrically from each other by a transparent insulating protective film. The interdigitated members form capacitors having variable capacitance. When a drop of water accumulates on a portion of the protective coating between a pair of finger members, the capacitance of the capacitor becomes greater than the normal capacitance because the dielectric constant of the drop of water on the protective coating is greater than the dielectric constant of air. Accordingly, as the number of drops of water on the protective coating increases, the total capacitor output increases.

SUMMARY OF THE INVENTION

The present invention provides a sensor to detect rainfall on a vehicle windshield. First and second closely spaced, exposed electroconductive members, such as a metallic film or cured ceramic paint, are secured to the outboard surface of a windshield. The sensor members are preferably abuse resistant because they are uncovered and directly exposed to the environment and the wiping action of the windshield wipers. The members include interdigitated fingers to increase the length of the interface therebetween and function as an impedance network that operates as a resistor or capacitor, depending on the presence of moisture on the sensor. The sensor is electrically connected to an electrical signal generator and an electrical signal receiver. In one particular embodiment of the invention, the generator and receiver are directly connected to the first and second members, respectively, by electrically conductive leads. The leads are insulated from each other to prevent moisture that accumulates between the leads from bypassing the sensor circuitry of the first and second members.

In an alternate embodiment, the sensor includes a third electroconductive member secured to a flexible, polyester film. The film is positioned between the glass plies of the windshield such that the second member overlays at least a portion of the third member. The first member is connected to the electrical signal generator, and the third member is connected to the electrical signal receiver to form a circuit with the outer glass ply and interlayer of the windshield operating as a dielectric between the second and third members to form a capacitor.

In operation, when moisture accumulates on the windshield sensor and bridges the space between the interdigitated fingers of the first and second exposed electroconductive members, the character of an electrical signal generated by the signal generator and passing through the circuit is altered. The change in the signal is detected by a signal receiver. In response to the altered signal, the windshield wiper motor is energized to clear the outboard surface of the windshield.

DETAILED DESCRIPTION OF THE INVENTION

The present invention is discussed with its use in conjunction with a laminated windshield construction, but it will be appreciated that the invention may be used in any application where it is desired to sense surface moisture.

Figure 1:
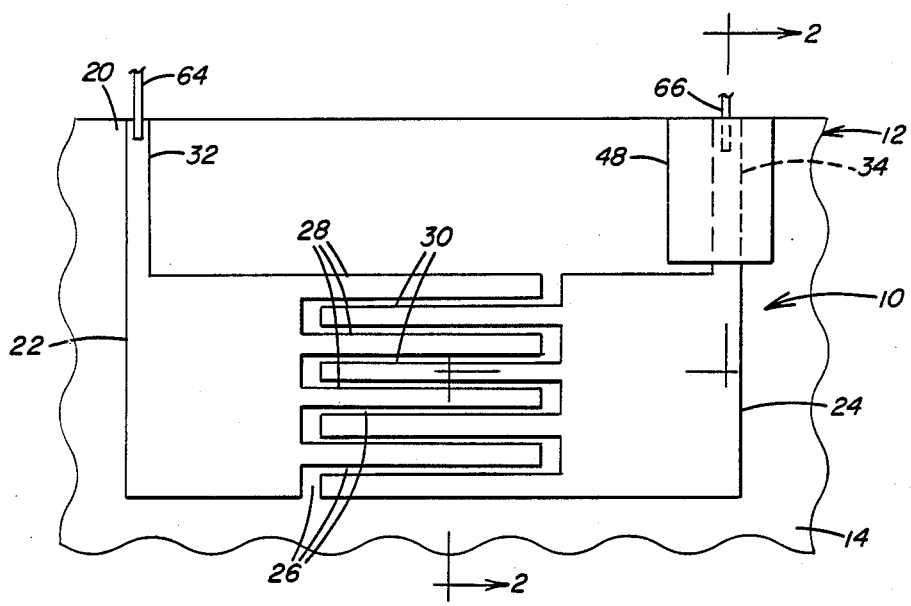
FIG. 1 is a plan view of a sensor incorporating features of the present invention having two electroconductive coating members.
Figure 2:
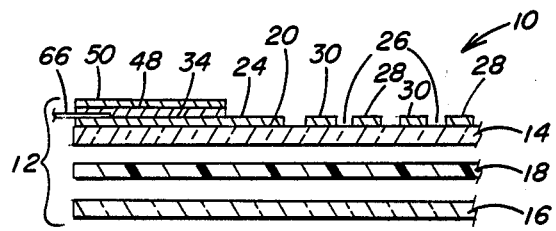
FIG. 2 is an exploded view through line 2—2 of FIG. 1 illustrating interdigitated conductive members of the coating members, the electrical lead connectors, and the electrical lead protective coating of the present invention.

Referring the FIGS. 1 and 2, a rain sensor 10, which is the subject of the present invention, is incorporated in a conventional trilayer windshield 12 which includes an outer glass ply 14, inner glass ply 16 and flexible interlayer 18. The sensor 10 may be positioned anywhere on the windshield 12, but preferably is located in an area that is swept by the windshield wipers (not shown) as they clear the viewing area of the windshield 12.

In the particular embodiment of the invention illustrated in FIGS. 1 and 2, the outer surface 20 of the outer ply 14 includes two electroconductive members 22 and 24 spaced apart and electrically insulated from each other by gap 26 of a predetermined width. The gap 26 should not be greater than the width of a rain drop or mist droplet that may impact or accumulate on the windshield 12 and preferably is in the range of approximately 0.015 inches to 0.030 inches (0.38 mm to 0.76 mm). Unlike other rain sensors, there is no protective coating over the members 22 and 24 so that they are exposed. As a result, the members 22 and 24 should be abuse resistant i.e., abrasive, solvent, and weather resistant.

The members 22 and 24 may be deposited on the outer surface 20 of ply 14 by any technique that will not adversely affect the optical quality of the windshield 12, and may be any of a number of different types of electroconductive coatings or materials. For example, the members 22 and 24 are preferably an electroconductive film, such as but not limited to a tin oxide coating, deposited on the surface 20 of ply 14 by vacuum deposition or pyrolytic deposition techniques. As an alternative, the members 22 and 24 may b conductive material deposited on the glass using a laser. A laser beam passes through the glass to a non-laser transparent conductive material, such as for example silver, gold or zinc. The supporting material vaporizes and deposits itself on and/or in the glass according to a pattern formed by the laser beam's movement. As another alternative, members 22 and 24 may include conductive materials sprayed on the glass. A negative pattern of the desired members is applied to the glass surface using a high temperature masking material. A metalizing gun is used to spray hot metal, such as aluminum, onto the glass surface and the hot metal bonds to the glass. Thereafter, the masking material is removed. If desired an additional coating, such as hot nickel, may be sprayed on the aluminum to form a durable coating prior to removing the mask. Although not limiting in the present invention, the masking material may be a water-soluble material, such titanium oxide or boron nitrate, that can be removed by washing the coated mask. Still another embodiment includes adhering electrically conductive foils to surface 20 to provide the electroconductive members 22 and 24. As another alternative, the members 22 and 24 may be a conductive ceramic paint containing low melting temperature frit and metallic powder applied to the glass, for example, by silk screening.

The members 22 and 24 may be interdigitated with projections 28 of member 22 positioned between and spaced from complementing projections 30 of member 24. The interdigitation increases the length of the interface between members 22 and 24, as will be discussed later. Gap 26 electrically insulates projections 28 from projections 30.

It should be noted that the thinner the coatings 22 and 24, the better a windshield wiper (not shown) can remove water accumulated in the gap 26 as the wiper sweeps across sensor 10, as will be discussed later.

With continued reference to FIGS. 1 and 2, lead members 32 and 34 extend from members 22 and 24, respectively, and terminate at edge 36 of the windshield 12 and are electrically connected to sensor controls 38 shown in FIG. 5, which includes an electrical signal generator 40 and an electrical signal receiver 42, respectively, both of which may be incorporated into a controller 44 as will be discussed. Lead members 32 and 34 may be applied in a manner similar to that discussed earlier with respect to members 22 and 24.

To prevent moisture or deposits which may form an electrically conductive surface, e.g., salt or the vehicle body (not shown) that surrounds the windshield 12, from electrically interconnecting the leads 32 and 34 and shorting the portion of sensor circuitry 46 (shown schematically in FIG. 5) formed by members 22 and 24, the leads must be electrically insulated from each other. In the particular embodiment of the invention illustrated in the FIGS. 1 and 2, the leads 32 and 34 are both covered with an abuse and water resistant coating 48, but as can be appreciated, only one lead need be coated in order to electrically insulate one lead from the other. Although not limiting in the present invention, in one particular embodiment, the coating 48 is a durable, clear ceramic enamel such as Drakenfeld 20-1609 enamel, or a colored enamel such as Drakenfeld 24-2190 enamel, both available from Drakenfeld Colors, Pennsylvania. Care must be taken to avoid pinholes or pores in coating 48 that would allow water to contact and electrically interconnect the leads 32 and 34. To improve resistance to circuit shorting due to these coating defects, the coating 48 may be treated with an overcoat 50. In one particular embodiment, the coating 48 was a ceramic coating available from O. Hommel, Pa, under the designation 41-454 and the overcoat 50 was an silane primer designated as 435.21 available from Essex Chemical Company, Michigan. The overcoat 50 was applied to the coating 48 at room temperature and polymerized in the pores and sealed them. Urethane primers, such as Essex Chemical Co. 435.20 and 435.34 were also used successfully to seal the pores in the coating 48.

As an alternative, durable, thin insulating films such as silica oxide or other silica based films having a low index of refraction that substantially matches the refractive index of the underlying glass, as well as titanium oxide containing coatings such as titanium isopropoxide, may be used to insulate leads 32 and 34.

Figure 3:
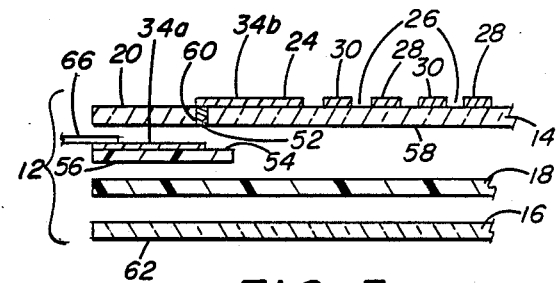
FIG. 3 is an exploded view similar to that in FIG. 2 showing an alternate arrangement for electrically insulating the lead portions of the electroconductive coating members of the sensor illustrated in FIG. 1.

FIG. 3 illustrates an alternate lead arrangement to ensure that leads 32 and 34 remain electrically insulated from each other. At least one of the leads, for example, lead 34 extends through opening 52 in the outer ply 14 so that leads 32 and 34 are physically separated by a non-moisture penetrable barrier i.e., the glass ply 14. Portion 34a of lead 34 may be applied on surface 54 of a flexible carrier 56, such as a polyester film, and positioned between glass ply 14 and interlayer 18 as shown in FIG. 3. As an alternative, lead portion 34a may be applied directly to the inner surface 58 of glass ply 14. An electroconductive connector 60 extends through opening 52 in glass ply 14 interconnecting lea portion 34a with lead portion 34b. Although not limiting in the present invention, the connector 60 may be a terminal bonded in place with a conductive silicone adhesive. Surface 54 of flexible carrier 56 facing inner surface 58 of glass ply 14 may be provided with an adhesive coating to prevent delaminttion therebetween. The coating may be, for example, a pressure sensitive acrylic adhesive or polyvinylbutyral (2½% by weight) dissolved in methanol.

As can be appreciated by one skilled in the art, connector 60 may extend completely through the windshield 12 to electrically isolate the leads. In such a configuration, a connector (not shown) would extend from lead portion 34b through the thickness of the windshield 12 to lead portion 34a which would be on the inboard surface 62 of the innerply 16. Furthermore, it is obvious that both leads 32 and 34 may extend partially or completely through the windshield 12 so that the glass plies 14 and 16 and/or interlayer 18 electrically insulate one lead from the other. It should be noted that if portions of both leads 32 and 34 are on surface 62, although they may be insulated from each other due their physical separation, an insulation coating may be required over at least one of the leads to prevent shorting of the circuit by moisture or ice on the inside surface 62 of the windshield 12.

To operate the sensor 10, the sensor circuitry 46 of the members 22 and 24 must be connected to the sensor controls 38. Referring to FIGS. 1 and 2, circuitry leads, for example wires 64 and 66, are connected to leads 32 and 34, respectively by, for example, ultrasonic soldering or electroconductive adhesives. Where a coating 48 and overcoat 50 (if required) coat the leads 32 and 34, the portion of the coating and overcoat over the leads must be removed, for example, by sanding, to allow electrical connection between leads 64 and 66 and leads 32 and 34, respectively. In the particular embodiment illustrated in FIG. 3, where the lead 34 is embedded within the windshield 12, the conductive member 66, may be laminated into the windshield assembly 12 to provide an electrical connection between the sensor controls 38 and the circuitry 46.

Figure 4:
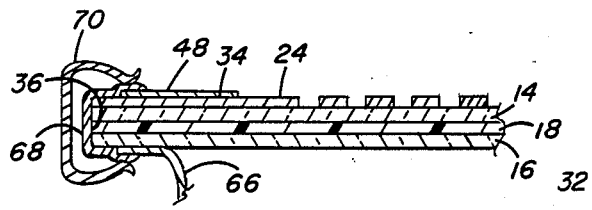
FIG. 4 is a view similar to that in FIG. 2 showing an alternate electrical lead connection arrangement for the rain sensor illustrated in FIG. 1.

As an alternative, referring to in FIG. 4, a conductive member 68, such as for example, a layer or sheet of conductive silicone rubber is wrapped around edge 36 of the windshield 12 at each lead 32 (not shown i FIG. 4) and 34 to contact each lead 32 or 34 with the corresponding circuitry lead 64 or 66. Spring clip 70 secures the members 68 and circuitry leads 64 and 66 in place relative to leads 32 and 34, respectively. It would be obvious to one skilled in the art that other connection arrangements may be used.

In one particular embodiment of the sensor 10 illustrated in FIGS. 1 and 2, glass plies 14 and 16 were 0.090 inch thick (2.3 mm) Solex ® glass an interlayer 18 was 0.030 inch thick (0.8 mm) polyvinylbutyral. Coating members 22 and 24, including projections 28 and 30, respectively, and leads 32 and 34 were a transparent, tin oxide film applied by pyrolytic deposition techniques, as taught in U.S. Pat. No. 3,677,814 which teachings are hereby incorporated by reference, providing a surface resistivity preferably in the range of 50 to 1000 ohms per square. The leads 32 and 34 were positioned as shown in FIG. 1 and coated with a clear ceramic enamel. Each projection 28, 30 was approximately 3/16 inches (0.48 cm) wide with gap 26 between the projections being approximately 0.015 to 0.030 inches (0.38 to 0.76 mm). The leads 32 and 34 were positioned as shown in FIG. 1 and were coated with a clear ceramic enamel. In the particular embodiment illustrated in FIG. 3, the flexible carrier 52 was a polyester film approximately 0.0035 inches thick (0.09 mm).

Figure 5:
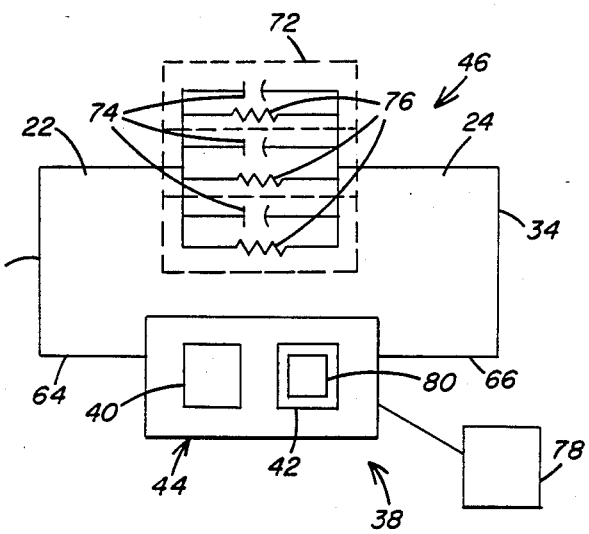
FIG. 5 is a schematic of a circuit that may be used in the practice of the invention.

FIG. 5 shows the schematic circuit 46 illustrating the operation of the sensor 10. The interdigitated projections 28 and 30 form an impedance network 72. Each pair of adjacent projections effectively operate as a capacitor 74 and a resistor 76 in parallel. Reference signals from the signal generator 40 are inputted into the circuit 46 through lead 32 and the output signal passes through lead 34 to signal receiver 42. Variations in the output signal from the sensor 10, i.e., network 72, are forwarded along lead 34 and monitored by controller 44. When the sensor 10 is dry, the impedance network 72 will function essentially like a capacitor, i.e., the capacitance of capacitor 74 and the resistance of resistor 76 are both high, the signal will therefore pass principally through capacitor 74, producing an output signal characteristic of the dry condition, i.e., a reference output signal. However, when water lays on the sensor 10, the impedance network 71 will function essentially like a resistor, i.e., the capacitance of capacitor 74 and the resistance of resistor 76 decreases; the signal therefore will pass principally through resistor 76 of circuit 46, producing an output signal characteristic of the wet condition, i.e., an activation output signal.

Although not limiting in the present invention, in on particular embodiment, the monitorable input signal is a series of rectangular voltage pulses. With this input signal, the dry condition reference output signal is a series of spike-like pulses and the wet condition activation output signal is a series of attenuated rectangular pulses. Other signals characteristic of the circuit such as current or impedance, may also be used to indicate a change from a dry or wet condition. Controller 44 forwards a signal to wiper motor 78 when the receiver 42 senses the activation signal to operate the windshield wiper (not shown) and clear the viewing area of the windshield 12.

When activated, the wiper motor 78 may operate to put the wipers in one of several modes. If desired, the windshield wipers (not shown) may make a single pass across the windshield 12 to clear any accumulated water from the sensor 10 or operate for a given time period or set number of passes. In addition, the control circuitry of windshield wipers (not shown) may be such that if the motor 78 is repeatly activated so as to move the wipers to make a predetermined number of passes within a set time period, the motor 78 will remain activated until it is manually switched off by the vehicle operator.

As more water accumulates across gaps 26 of the sensor 10, the current from member 22 to 24 increases so as to change the activation signal. If desired, signal receiver 42 or controller 44 may include a sensing circuit 80 that monitors changes in the activation signal. By linking the control of a variable speed motor 78 to the sensing circuit 80, the controller 44 may control the speed of the motor 78 to vary the speed of the wipers in response to the output signals received from the sensing circuit.

It should be further appreciated by one skilled in the art that multiple sensors may be positioned on different portions of the windshield 12 to independently control separate windshield wiper motors or their speed. For example, a first sensor may be positioned in the vehicle operator's viewing area and a second sensor in the passenger's viewing area or one sensor may operate the wipers at a low speed and another sensor operate the wipers at a higher speed.

Figure 6:
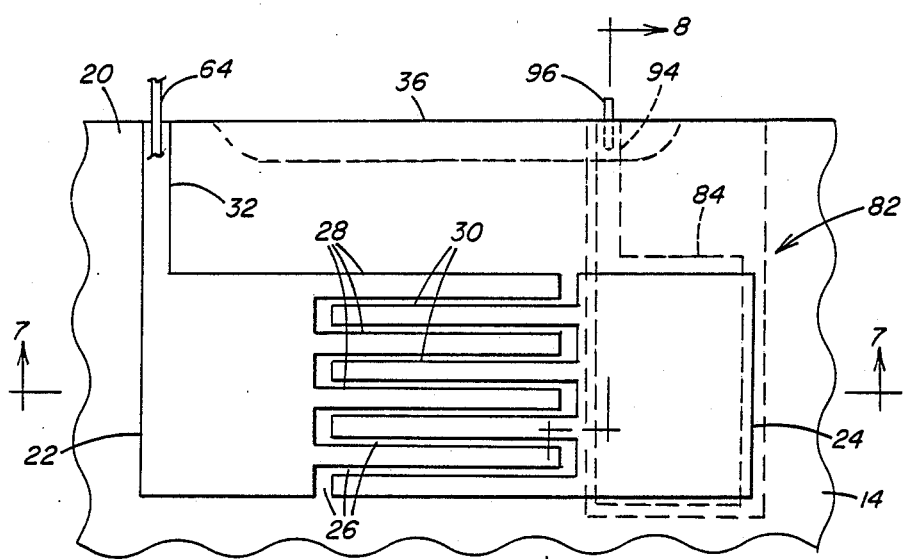
FIG. 6 is a plan view of an alternate embodiment of the sensor of the present invention incorporating three electroconductive members.
Figure 7:
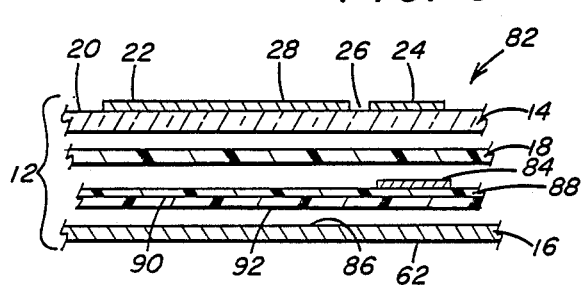
FIG. 7 is an exploded view through line 7—7 of FIG. 6 illustrating the three electroconductive members.
Figure 8:
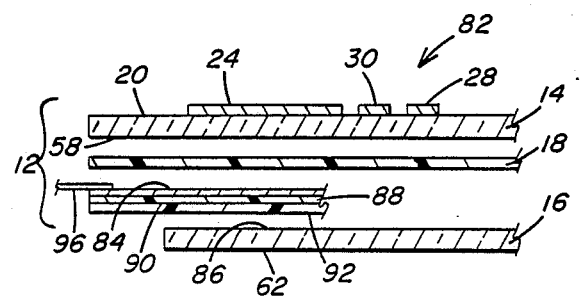
FIG. 8 is an exploded view through line 8—8 of FIG. 6 illustrating the interdigitated conductive members and an internally positioned lead extending from the inner coating member.

FIGS. 6 through 8 illustrate an alternate rain sensor 82 configuration. During the following discussion, elements that are common to both rain sensor 10 and 82 will have the same numerical designation. In a manner similar to that discussed earlier, first and second coatings 22 and 24 are deposited on surface 20 of outer ply 14 of windshield 12. A third electroconductive coating 84 is provided within the windshield 12 and preferably along the surface 86 of the inner ply 16. The coating 84 may be applied directly to surface 86 of ply 16, or as shown in the particular embodiment illustrated in FIGS. 6 through 8, coating 84 may be applied to a flexible carrier 88 such as, for example, a plastic film which is inserted between the inner ply 16 and interlayer 18. In this embodiment, the coating 84 is adjacent to the interlayer 18 although the carrier and coating assembly may be flipped so that the coating 84 is directly contacting ply 16. Surface 90 of the carrier 88 facing surface 86 of the ply 16 may be provided with an adhesive coating 92 to help prevent delamination of the windshield between carrier 88 and glass ply 16, as discussed earlier. Coating 84 is positioned so as to underlie coating 24 and be spaced therefrom by outer ply 14 and interlayer 18 as shown in FIGS. 7 and 8. It is not necessary that coating 84 be abuse resistant since it is sealed within the windshield 12. As with coatings 22 and 48, the coating 84 may be, e.g., an electrically conductive ceramic paint or metallic film applied by well known techniques that will not adversely affect the optical properties of the windshield 12 or carrier 88. It should be noted that in the embodiment where the coating 84 is applied to a carrier 88 as shown in FIGS. 6 through 8 rather than directly to the surface 86 of inner ply 16, high temperature coating techniques such as pyrolytic deposition are not recommended because the optical quality of the carrier 88 may be distorted, resulting in an overall optical defect in the windshield 12.

Figure 9:
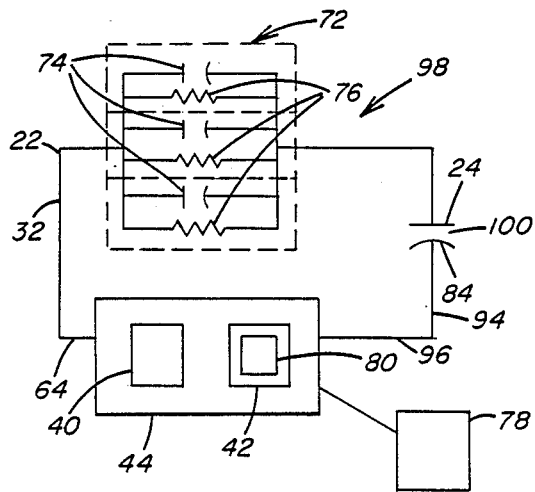
FIG. 9 is a schematic of a circuit that may be used in the practice of this invention.

Lead member 32 and 94 extend from coatings 22 and 84, respectively, to the edge 36 of the windshield 12 and are electrically connected to the electrical signal generator 40 and an electrical signal receiver 42, respectively, (shown in FIG. 9). Referring to FIGS. 6 and 8, a portion of the inner ply 16 may be removed along edge 36 to expose the end of lead 94 when carrier 88 is pulled away from the interlayer 18 for electrical connection. Circuitry leads 64 and 96 connect the leads 32 and 94 with generator 40 and receiver 42, respectively.

In a particular embodiment of the rain sensor illustrated in FIGS. 6 through 8, glass plies 14 and 16 were 0.090 inch thick (2.3 mm) Solex ® glass and interlayer 18 was 0.030 inch thick (0.8 mm) polyvinylbutyral. Coatings 22 and 24 were a transparent tin oxide providing a surface resistivity preferably in the range of approximately 50 to 1000 ohms per square. The flexible carrier 88 was a polyester film approximately 0.0035 inch thick (0.09 mm). Coating 84 was a transparent metallic film, including silver and zinc stannate, similar to the film taught in U.S. Pat. No. 4,610,771 to Gillery, which teachings are hereby incorporated by reference, and preferably provided a resistance of approximately 15 ohms per square or less.

FIG. 9 shows a schematic circuit 98 illustrating the operation of the sensor 82. Coatings 24 and 84 operate as capacitive plate members with a dielectric member, i.e., glass ply 14 and interlayer 18, therebetween, to form capacitor 100. As discussed earlier, the interdigitated projections 28 and 30 of coatings 22 and 2 form impedance network 72 with each pair of adjacent projections operating essentially as a capacitor 74 and a resistor 76 in parallel. Sensor 82 operates in a manner similar to that discussed earlier with respect to sensor 10. A series of signals from the signal generator 40 are inputted into the circuit 98 through lead 32 and the output signal passes through lead 94 to signal receiver 42. Variations in the output signal are monitored by controller 44. When the sensor 82 is dry, the impedance network 72 will function essentially like a capacitor, and when water lays on the sensor 10 accumulating in gaps 26, the impedance network 72 will function essentially like a resistor. In addition, the signal also passes through capacitor 100.

It should be appreciated that the lead arrangement in the embodiment of the present invention illustrate in FIGS. 6 through 8 prevents shorting of the sensor 82 which would result in constant running of the windshield wiper motor, without coating any portion of the leads 32 and 94. In particular, the leads 32 and 94 are separated by glass ply 14 and interlayer 18. As a result, they remain electrically insulated from each other so that moisture, conductive surface deposits, or the vehicle body (not shown) that surrounds the windshield 12 electrically interconnect leads 32 and 94, thus bypassing the circuit 98.

In the embodiment of the invention illustrated in FIGS. 6 through 8, it should be obvious that coating 84 is not limited to being positioned between interlayer 18 and ply 16. Carrier 88 may be positioned anywhere on or within the windshield 12, with coating 84 being directed toward or away from the adjacent glass ply 14 and 16. Furthermore, the coating 84 may be applied directly to surface 58 of the ply 14 with the glass ply 14 operating as the dielectric layer of the capacitor 100 or to surface 62 of ply 16 with the entire windshield 12 operating as the dielectric layer.

Figure 10:
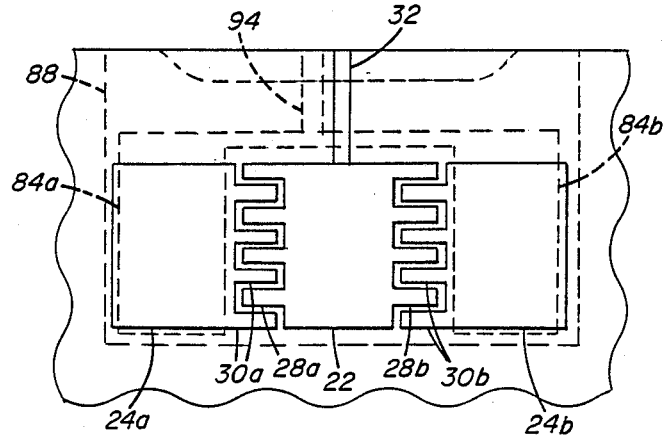
FIG. 10 is a plan view of an alternate rain sensor configuration incorporating features of the present invention.

FIG. 10 illustrates an alternate sensor configuration similar to sensor 82. In particular, first coating 22 includes two sets of projections 28a and 28b which are interdigitated with projections 30a and 30b of interconnected second coatings 24a and 24b, respectively. Third interconnected coatings 84a and 84b are positioned within the windshield 12 and underlay coatings 24a and 24b, respectively. Leads 32 and 94 connect the sensor to an electrical signal generator and receiver.

The sensors 10 and 82 may be used in a windshield having a bilayer construction (not shown), i.e., a windshield having a single outer glass ply and an inner impact-absorbing antilacerative ply. As with the embodiments shown in FIGS. 1 through 4, the members 22 and 24 of the sensor 10 would be positioned along the outer surface of the glass ply with leads 32 and/or 34 protected in a manner as discussed previously. As with the embodiment shown in FIGS. 6 through 8, the coatings 22 and 24 of the sensor 82 would be positioned along the outer surface of the windshield an coating 84 would be positioned along the inner surface of the glass ply.

In addition, the sensors 10 an 82 may be used in combination with an electrically heated windshield which includes an electroconductive heating film on surface 86 or 58 of glass plies 16 and 14, respectively. With respect to sensor 82 the heating film may operate as the third coating 84 or a portion of the heating film may be deleted to provide an area for coating 84. As an alternative, the heating film and coating 84 may be applied simultaneously by appropriately masking the heating film so as to provide the proper pattern for the coating 84.

Furthermore, the sensors 10 and 82 are not limited to use only on the outboard surface of a windshield. For example, the sensor 10 may be used to detect fog or ice on the inboard surface of vehicle window by locating members 22 and 24 on the inboard surface of the glass ply. Sensor 82 would also include coating 84 along an opposing major surface of the glass ply. The sensor would activate a window clearing apparatus such as a window defogger or an electrically heatable window. It should be noted that if coating 84 is positioned on a surface exposed to the outside environment, the coating 84 must be either abuse resistant or protected with an additional abuse resistant coating as previously discussed.

Unlike other rain sensors which constantly monitor variations in capacitance caused by moisture absorbant coatings or dielectric substrates, there are no variations in circuits 46 and 98 of sensors 10 and 82, respectively, due to changes in moisture absorption because there is no coating over coating members 22 or 24 and there is no water absorbant dielectric positioned between the members. The sensors of the present invention requires only a monitorable change is the nature of the electrical signal through the sensor circuitry due to water accumulation between members 22 and 24. As a result, it is important that at least a portion of the members 22 and 24 remain exposed so that moisture may bridge gap 26 and alter the sensor input signal.

The forms of this invention shown and described in this disclosure represent illustrative embodiments and it is understood that various changes may be made without departing from the scope of the invention as defined in the following claims.

We claim:

1. A sensor for detecting moisture comprising:
a dielectric substrate;
first and second electronconductive members positioned in an adjacent spaced apart relationship relative to each other on a first major surface of said substrate, wherein adjacent portions of said first and second members have exposed, uncoated electroconductive surfaces;
first and second electroconductive leads extending from said first and second electroconductive members, respectively;
means to electrically insulate said leads from each other;
means to permit electrical connection of said first lead to an electrical signal generator capable of inputting a reference signal into said sensor; and
means to permit electrical connection of said second lead to an electrical signal receiver capable to monitoring variations in the output signal from said sensor.

2. The sensor a in claim 1 wherein at least said substrate and said electroconductive members are transparent.

3. The sensor as in claim 2 wherein said electroconductive members are metallic film.

4. The sensor as in claim 2 wherein said substrate includes a Portion with an aperture extending from said first major surface of said substrate to the opposing major surface and further wherein a lead portion of at least one of said leads is positioned along said opposing major surface and further including means to connect said lead with said lead portion.

5. The sensor as in claim 4 wherein said lead portion of said at least one of said leads is secured to a flexible carrier positioned adjacent to said opposing major surface of said substrate.

6. The sensor as in claim 2 wherein said insulating means includes a moisture resistant coating overlaying at least one of said leads.

7. The sensor as in claim 6 wherein said coating is a ceramic enamel.

8. The sensor as in claim 6 wherein said coating is a silica containing film.

9. The sensor as in claim 6 wherein said coating is a transparent titanium containing film.

10. The sensor as in claim 6 wherein said coating, substrate, and electroconductive members are transparent.

11. The sensor as in claim 6 further including means to overcoat said coating wherein said overcoat seals any moisture penetrable openings in said coating.

12. The sensor as in claim 11 wherein said overcoat is an silane coating.

13. The sensor as in claim 11 wherein said overcoat is a urethane coating.

14. The sensor as in claim 11 wherein said coating and said overcoat electroconductive members and substrate are transparent.

15. The sensor as in claim 2 wherein said substrate is the outer ply of a vehicle windshield and said first major surface of said substrate is the outboard surface of said windshield and further wherein said first electroconductive member includes a first set of projections and said second electroconductive member includes a second set of projections wherein said first projections are positioned between and spaced from said second projections such that said projections function as a plurality of capacitors when said sensor is dry, and as a plurality of resistors when water accumulates between said spaced apart projections.

16. A sensor for detecting moisture comprising:
a dielectric substrate;
first and second electroconductive members positioned in an adjacent spaced apart relationship relative to each other on a first major surface of said substrate, wherein adjacent portions of said first and second members have exposed, uncoated electroconductive surfaces;
a third electroconductive member spaced from said first and second electronconductive members and having said substrate therebetween wherein said second electroconductive member overlays at least a portion of said third electroconductive member;
means to permit electrical connection of said sensor to an electrical signal generator capable of inputting a reference signal into said sensor and an electrical signal receiver capable of monitoring variations in the output signal form said sensor; and means to electrically insulate said electrical connection means from each other.

17. The sensor as in claim 16 wherein said electrical connection means includes first and second electroconductive leads extending from said first and third members, respectively, to permit electrical connection to said generator and receiver.

18. The sensor as in claim 17 wherein said substrate and said electroconductive members are transparent.

19. The sensor as in claim 18 wherein said electroconductive members are metallic coatings and said first electroconductive member includes a first set of projections and said second electroconductive member includes a second set of projections, wherein said first projections are positioned between and spaced from said second projections such that said projections function as a plurality of capacitors when said sensor in dry and as a set of resistors when water accumulates between said spaced apart projections.

20. The sensor as in claim 18 wherein said substrate is a first substrate and further including additional substrates secured to said second major surface of said first substrate to form a composite assembly.

21. The sensor as in claim 20 wherein said additional substrates include a second substrate secured to said second major surface of said first substrate with an interlayer material positioned therebetween and further wherein said third electroconductive member is positioned between said interlayer and said second substrate.

22. The sensor as in claim 21 wherein said first electroconductive member includes a first set of projections and said second electroconductive member includes a second set of projections wherein said first projections are positioned between and spaced from said second projections such that said projections function as a plurality capacitor when said sensor is dry, and as a plurality of resistors when water accumulates between said spaced apart projections.

23. The sensor as in claim 22 wherein said third electroconductive members is secured to a flexible carrier positioned between said interlayer and second substrate.

24. The sensor as in claim 23 wherein said composite assembly is a vehicle windshield and said first major surface of said first substrate is the outboard surface of said windshield.

* * * * *